US007920493B2

(12) United States Patent
Jabri et al.

(10) Patent No.: US 7,920,493 B2
(45) Date of Patent: Apr. 5, 2011

(54) FAST SESSION SETUP EXTENSIONS TO H.324

(75) Inventors: Marwan Jabri, Tiburon (AU); Albert C. Wong, Rohnert Park, CA (US); David Jack, Reading (GB); Brody Kenrick, San Francisco, CA (US); Robert Jongbloed, Rozelle (AU)

(73) Assignee: RPX Corporation, San Francisco, CA (US)

(*) Notice: Subject to any disclaimer, the term of this patent is extended or adjusted under 35 U.S.C. 154(b) by 554 days.

(21) Appl. No.: 11/408,810

(22) Filed: Apr. 21, 2006

(65) Prior Publication Data
US 2007/0014251 A1    Jan. 18, 2007

Related U.S. Application Data

(60) Provisional application No. 60/674,160, filed on Apr. 21, 2005.

(51) Int. Cl.
*H04B 7/00* (2006.01)
(52) U.S. Cl. .............................. 370/310; 398/41; 398/42
(58) Field of Classification Search .................. 370/310
See application file for complete search history.

(56) References Cited

U.S. PATENT DOCUMENTS

| | | | |
|---|---|---|---|
| 6,625,223 B1 | 9/2003 | Wimmer et al. | |
| 6,810,035 B1 | 10/2004 | Knuutila et al. | |
| 6,909,708 B1* | 6/2005 | Krishnaswamy et al. | 370/352 |
| 6,922,731 B1* | 7/2005 | Morioka et al. | 709/231 |
| 7,139,279 B2* | 11/2006 | Jabri et al. | 370/410 |
| 2003/0202487 A1* | 10/2003 | Harris et al. | 370/329 |
| 2004/0028037 A1* | 2/2004 | Rasanen et al. | 370/354 |
| 2004/0076145 A1* | 4/2004 | Kauhanen et al. | 370/352 |
| 2004/0158647 A1* | 8/2004 | Omura | 709/249 |
| 2004/0174817 A1* | 9/2004 | Jabri et al. | 370/238 |

(Continued)

FOREIGN PATENT DOCUMENTS

WO    WO 02052825 A1    7/2002

(Continued)

OTHER PUBLICATIONS

Series H: Audiovisual and Multimedia Systems, Infrastructure of Audiovisual Services—Systems and Terminal Equipment for Audiovisual Services, Extended Fast Connect Feature, ITU—T Recommendation H 460.6, Oct. 6, 2002, pp. 3-17.

(Continued)

*Primary Examiner* — Lester Kincaid
*Assistant Examiner* — Diego Herrera
(74) *Attorney, Agent, or Firm* — Kilpatrick Townsend & Stockton LLP

(57) ABSTRACT

A method of initiating a set up process for a call between users with reduced set up times using one or more 3G telecommunication networks. The method is provided between at least a pair of H.324-like terminals coupled to the one or more 3G telecommunication networks. The method includes establishing a bearer channel between a first terminal and a second terminal after a call signaling process, transmitting a first FSS message from the first terminal to the second terminal. The first FSS message includes a first preference profile associated with a first mode of operation for the call and a second preference profile associated with a second mode of operation for the call. The method also includes selecting either the first mode of operation or the second mode of operation.

14 Claims, 4 Drawing Sheets

U.S. PATENT DOCUMENTS

| | | | |
|---|---|---|---|
| 2005/0193420 A1* | 9/2005 | Hocevar et al. | 725/80 |
| 2007/0014251 A1* | 1/2007 | Jabri et al. | 370/310 |
| 2007/0266161 A1* | 11/2007 | Kenrick et al. | 709/227 |
| 2007/0297352 A1* | 12/2007 | Jabri et al. | 370/261 |

FOREIGN PATENT DOCUMENTS

| | | |
|---|---|---|
| WO | WO 2004/054221 | 6/2004 |
| WO | WO 2006/066246 A2 | 6/2006 |

OTHER PUBLICATIONS

Jabri et al. Dilithium Networks, "Fast session setup extensions to H.324," ITU Telecommunication Standardization Sector, Study Group 16—Delayed Contribution 32, Nov. 16, 2004, pp. 1-18.

Jabri et al. Dilithium Networks, "Proposal of Bearer-Based Fast Session Setup Procedure to H. 324," ITU Telecommunication Standardization Sector Study Group 16, Q.1/16 Rappporteur Meeting, Biel-Bienne, Switzerland 19-20-2005, Document Q1-D16, retrieved from the Internet:<http://www.imtc.org/docs/Q1-16_Proposal_of_Bearer-based_FastSession_Setup_Procedure_to_h324.doc, 29 pages.

Supplementary European Search Report of EP Application No. 06751047, dated Nov. 26, 2008, 14 pages total.

"Terminal for Low Bit-rate Multimedia Communication"; H.324 ITU-T Mar. 2002; pp. 1-66.

"Multiplexing Protocol for Low Bit Rate Multimedia Communication"; H.223 ITU-T; Jul. 2001, pp. 1-63.

* cited by examiner

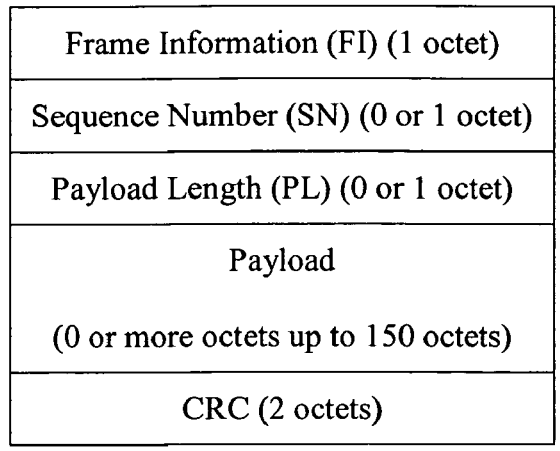
FIG. 1. H.324 - Structure of the Fast Session Setup frames.
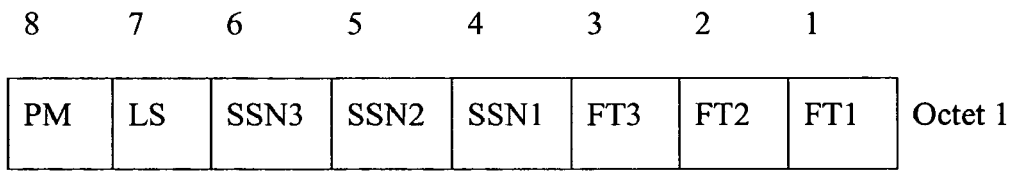
FIG. 2. H.324 - Structure of the Fast Session Setup Frame Information (FI) field.
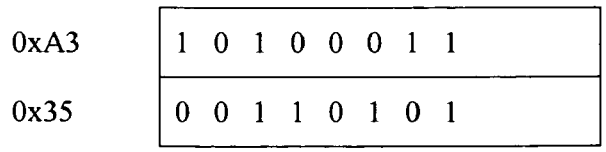
FIG. 3. H324 - Structure of the FSS Synchronization Flag.

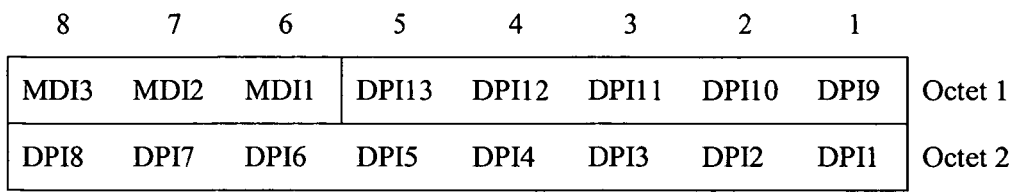
FIG. 4. H.324 - Structure of the Predefined Profile Index (PPI).
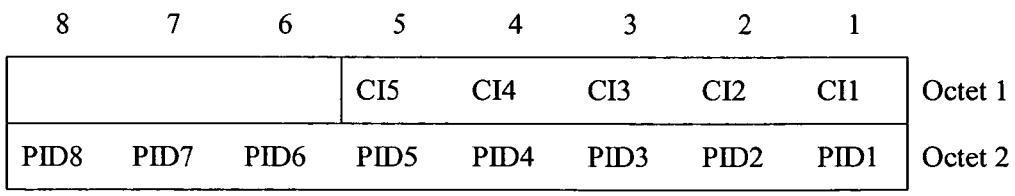
FIG. 5. H.324 - Structure of the Detailed Profile Index (DPI) in the PPI.

FAST SESSION SETUP EXTENSIONS TO H.324

CROSS-REFERENCES TO RELATED APPLICATIONS

This application claims priority to U.S. Provisional No. 60/674,160, filed Apr. 21, 2005, which is incorporated by reference herein for all purposes.

BACKGROUND OF THE INVENTION

The present invention relates generally to methods of establishing multimedia telecommunication (a multimedia "call") between equipment ("terminals"). More particularly, the invention provides methods for reducing the time required to establish calls between terminals that implement the ITU-T H.324 Recommendation and other Standards and Recommendations derived from or related to this such as the 3G-324M recommendation developed and adopted by the Third Generation Partnership Projects (3GPP and 3GPP2). Merely by way of example, the invention has been applied to the establishment of multimedia telecommunication between 3G-324M (H.324M based protocol) multimedia handsets on a mobile telecommunications network, and between 3G-324M multimedia handsets and H.323 based terminals on a packet network using a Multimedia Gateway to mediate between the protocols used at each endpoint, but it would be recognized that the invention may also include other applications.

H.324 is an International Telecommunication Union (ITU) protocol standard for multimedia communication over general switched networks (GSTN). H.324M is an extension of H.324 for operations over mobile networks, and 3G-324M is a recommendation by the third generation partnership program (3GPP) defining adaptation of H.324M for use within 3GPP and also adopted by 3GPP2. We call H.324-like equipment devices and systems employing protocol based or derived from H.324. H.324-like equipment can connect to other H.324-like equipment via switching centers and to other non-H.324-like equipment through multimedia gateways. An example of a non-H.324-like equipment is an H.323 equipment. H.323 is an International Telecommunication Union protocol Standard for multimedia communication over non-guaranteed bandwidth packet networks. An H.323-like equipment is an equipment that employs a protocol based or derived from the H.323 protocol.

Without any loss of generality, we will use the term "H.324" to indicate H.324-like equipment including H.324M and 3G-324M equipment and "H.323" to indicate H.323-like equipment.

Also without any loss of generality we use the term "equipment" to indicate either a user end equipment such as a handset, or network end equipment such as a switch or gateway. The term "equipment" covers the meaning of "entity." We also use the terms "equipment" and "terminal" interchangeably, and they both indicate the same meaning in the present document.

If a call is made between equipments which are an embodiment of the H.324, H.324M or 3G-324M, the first stage of the call is to establish an end-to-end bearer between the equipments. This stage is called Call Signaling and is outside the scope of H.324, except where modems and the General Switched Telephony Network are used. The second stage of the call is to establish the H.324 session, to provide a means of transporting video, audio and data between the equipments in a format that is known to, and supported by the equipments. In order to do this H.324M makes use of two further ITU-T Recommendations.

The first of these Recommendations used is H.223 "Multiplexing protocol for low bit rate multimedia communication". H.223 specifies a frame-oriented multiplexing protocol which allows the transfer of any combination of digital voice, video and data (e.g. command and control) information over a single communication link. The H.223 may have a number of modes of operation, specified in Annexes A, B and C of the H.223 Recommendation that are intended to provide increased resilience in the presence of errors. These are also known as Mobile Levels 1, 2 and 3. H.223 without the application of any of these Annexes is also sometimes referred to as operating at Mobile Level 0 (base-line). H.324 has the concept of Logical Channels which is a way of providing virtual channels over the circuit switched link. The role of the multiplexer is to combine (multiplex) parts of the data chunks written on the logical channels into frames known as a Multiplexer Protocol Data Unit (MUX-PDU). Logical Channel 0 is always available and is used for Command and Control. Data (voice, video, command and control and other general data) is passed to/from the H.223 multiplexer through bit-stream chunks called service data units (SDUs). Before being multiplexed, these different SDUs go through Adaptation Layers where extra information may be added for purposes such as error detection, sequence numbering and retransmission requests.

The second of these Recommendations is H.245 "Control protocol for multimedia communication" which specifies the syntax and semantics of terminal information messages as well as procedures to use them for in-band negotiation at the start of or during communication. The messages cover receiving and transmitting capabilities and preferences, logical channel signaling and control and indication. The messages that are specified in H.245 are expressed in the ITU-T Abstract Syntax Notation (ASN.1) and can be classified as of Request, Response, Command or Indication type. H.245 messages are encoded according to the ASN.1 standard before being transmitted. When a terminal sends an H.245 message of type Request it requires that an appropriate message of type Response is sent by the remote terminal. If the Response (sometimes referred to as an Ack for Acknowledgement) is not received within a certain time, the sending terminal will re-transmit the Request or take another appropriate action if no response has been received for repeated Requests. Re-transmission of requests may occur a number of times. Many of the H.245 messages associated with call set up are of the Request type.

H.245 also requires a reliable link layer for proper operation. The principal means of providing this, specified in Annex A of H.324, is to use the Simple Retransmission Protocol (SRP) or the Numbered Simple Retransmission Protocol (NSRP), in which one or more H.245 messages, known collectively as a MultimediaSystemControl PDU and in the present document as an H.245 PDU, are formed into SRP Command Frames prior to sending, and the receiving terminal must send an SRP Response Frame (Sometimes referred to as an SRP Ack) to acknowledge correct receipt of an SRP Command Frame. No further H.245 messages may be sent by a terminal until the SRP Ack for the last message has been received.

The combined effect of the requirement to send an H.245 Response message for each H.245 Request Message received, and of the need to receive an SRP Ack for every SRP Command Frame sent means that a single H.245 Request message may take some time to be conveyed successfully.

The communication involved in sending an H.245 Request message from one terminal (A) to another (B), and getting an H.245 Response (Ack) message back is shown in FIG. 1A, which also shows the SRP Command Frames (SRP CF) and SRP Response Frames (SRP RF or SRP Ack) involved when single H.245 messages are formed into single SRP Command Frames. The H.324 standard allows for multiple H.245 messages to be concatenated into a single SRP Command Frame; however this capability is often not implemented, in which case such terminals may respond only to the first H.245 message encountered in an SRP Command Frame. In some cases, terminals which do not support this capability may malfunction upon receipt of an SDU containing multiple H.245 requests or responses.

We will refer to the time taken for information transmitted by one terminal to reach the other terminal and be reflected back in a response to the first terminal (see examples in FIG. 1A) as a "round trip delay." It should be noted that this round-trip delay assumes devices involved in the media processing and communication do not add delays and is intended to be a representative measure of the network delay. An approximation of the round trip delay value can be determined by use of the H.245 RoundTripDelayRequest and RoundTripDelayResponse messages.

The key steps involved in setting up and connecting a typical H.324 call are as follows:
1. Call signaling (bearer establishment)—outside the scope of H.324. Normally a modem connection if GSTN, through ISDN, or signaling through mobile switching centers in the mobile case.
2. Mobile level detection (MLD)—Where a common Mobile Level is agreed on between equipments. This step is performed by H.324 equipment that supports mobile extensions such as H.324M and 3G-324M equipment.
3. Terminal Capability Exchange (TCS)—H.245 Messaging
4. Master Slave determination (MSD)—H.245 Messaging
5. Open/Close Logical Channels (OLC)—H.245 Messaging
6. Multiplexer Table Entries Exchange (MTE)—H.245 Messaging Steps (3) to (6) are performed using a sequence of H.245 Request and Response messages as described above and illustrated in FIG. 1A. The full sequence of Request and Response messages involved in an H.324 call is shown in FIG. 1B. Note the order of steps (5) and (6) above can be interchanged. It should be noted that Steps (3) to (6) relate to procedures that are defined by underlying state machines that are also known as Signaling Entities. The relevant signaling entities are:
1. Capability Exchange Signaling Entity (CESE)
2. Master Slave Determination Signaling Entity (MSDSE)
3. Logical Channel Signaling Entity (LCSE)
4. Multiplex Table Signaling Entity (MTSE)

Once these steps have completed, media (video, audio and data) can flow between the terminals. Note the H.245 messages flow on the Logical Channel 0 which as previously described is predefined and carried by the means of the multiplexer predefined Multiplex Table Entry 0. Once other Multiplex Table Entries have been exchanged these can also be used in conjunction with H.245 messages.

The key steps above are often handled sequentially; however this results in as many as ten H.245 message round trip delays in order to establish an H.324 session with two logical channels in each direction. In addition, the SRP scheme (or Numbered version—NSRP, in cases where the mobile level is greater than zero) used for H.324/H.245, which requires an SRP message to be received by the endpoint for every message sent, prior to sending any other message, regardless of whether it is associated with the same Signaling Entity or not, further limits the scope to pipeline messages on the network, making call set up slower than if this were not the case. SRP messages are not shown in FIG. 1B.

For H.324M, the Terminal Capabilities Set request (TCS) step described above and shown in FIG. 1B is preceded by a mobile level detection/multiplexer synchronization phase. This consists of each terminal transmitting a repeating pattern of bits (flags) that indicate the highest Mobile Level at which it operates. Each terminal examines the flags that it is receiving. If these flags represent a lower Mobile Level then the terminal drops down to the same lower level. When both terminals are transmitting the same flag sequence this step completes.

Arising from the set of procedures described above that are required to take place to establish an H.324M call, when a call is made from a terminal which is an embodiment of the H.324 it is prone to suffer from long call set up time, which is the interval between the time that the call signaling is initiated to the time that the exchange of voice and video commences between an H324-like end-point (H.324, H.324M or 3G-324M) and other terminals whether H.324-like or not.

The ITU Recommendation H.323 uses H.245 in a similar manner to H.324 for signaling command, control and indication messages related to a call. Unlike H.324, H.323 is equipped with a number of features to speed up the call set up time between H.323 equipment. Similar techniques exist for the IETF Session Initiation Protocol (SIP) protocol.

Thus there exists a need for techniques to speed up the call set up between H.324 like terminals and other terminals (including servers) either of the H.324 type directly, or terminals such as H.323 via multimedia gateways that terminates the H.324 side and would have an H.324-like termination in them. The differences between the H.324 protocol (and its extensions such as H.324M and 3G-324M) and H.323 and other protocols mean that additional aspects need to be considered when introducing call establishment speed-up techniques for H.324-like terminals. Such differences include the information about mobile levels where they are used and the messaging and information related to the H.223 multiplexer such as its multiplex table entries, adaptation layers and so on.

SUMMARY OF THE INVENTION

According to the present invention, techniques for telecommunications are provided. More particularly, the invention provides methods for reducing the time required to establish calls between terminals that implement the ITU-T H.324 Recommendation and other Standards and Recommendations derived from or related to this such as the 3G-324M recommendation developed and adopted by the Third Generation Partnership Projects (3GPP and 3GPP2). More specifically, it relates to Session Setup, a technique for reducing the session setup time for H.324-like terminals including 3GPP 3G-324M terminals, for example, over the in-band bearer connection. According to embodiments of the present invention, the techniques described herein are backward compatible to existing H.324-like implementations. In other embodiments, the invention has been applied to the establishment of multimedia telecommunication between 3G-324M (H.324M based protocol) multimedia handsets on a mobile telecommunications network, and between 3G-324M multimedia handsets and H.323 based terminals on a packet network using a Multimedia Gateway to mediate between the protocols used at each endpoint, but it would be recognized that the invention may also include other applications.

According to an embodiment of the present invention, a method of initiating a set up process for a call between users with reduced set up times using one or more 3G telecommunication networks is provided. The method is provided between at least a pair of H.324-like terminals coupled to the one or more 3G telecommunication networks. The method includes establishing a bearer channel between a first terminal and a second terminal after a call signaling process, transmitting a first FSS message from the first terminal to the second terminal. The first FSS message includes a first preference profile associated with a first mode of operation for the call and a second preference profile associated with a second mode of operation for the call. The method also includes selecting either the first mode of operation or the second mode of operation.

According to another embodiment of the present invention, a method of initiating a set up process for a call between users with reduced set up times using one or more 3G telecommunication networks is provided. The method is provided between at least a pair of H.324-like terminals coupled to the one or more 3G telecommunication networks. The method includes establishing a bearer channel between a first terminal and a second terminal after a call signaling process, providing a plurality of profiles for a mode of operation, and attempting to establish the call utilizing one of the plurality of profiles. The method also includes determining that the call was not established utilizing the one of the plurality of profiles and attempting to establish the call utilizing another of the plurality of profiles.

According to a specific embodiment of the present invention, a method of initiating a set up process for a call between users with reduced set up times using one or more 3G telecommunication networks is provided. The is provided between at least a pair of H.324-like terminals coupled to the one or more 3G telecommunication networks. The method includes establishing a bearer channel between a first terminal and a second terminal after a call signaling process and providing one or more modes of operation defined by a first FSS message. The one or more modes of operation include one or more of an audio codec and configuration, a video codec and configuration, a multiplexer level, a multiplexer table entry, a data channel, or a multiplexer capability. The method also includes receiving, at the first terminal, the first FSS message transmitted from the second terminal and transmitting a first data stream from the first terminal to the second terminal in a second FSS message. The first data stream utilizes the one or more modes of operation.

According to another specific embodiment of the present invention, a method of initiating a set up process for a call between users with reduced set up times using one or more 3G telecommunication networks is provided. The method is provided between at least a pair of H.324-like terminals coupled to the one or more 3G telecommunication networks. The method includes establishing a bearer channel between a first terminal and a second terminal after a call signaling process and providing one or more modes of operation defined by a first FSS message. The one or more modes of operation include a codec configuration and a multiplexer table entry. The method also includes receiving, at the first terminal, the first FSS message transmitted from the second terminal and determining from the first FSS message, at the first terminal, that the second terminal is not capable of receiving media until after a response message from the second terminal is received at the first terminal. The method further includes transmitting media after the reception of the response message from the second terminal.

According to a particular embodiment of the present invention, a method of initiating a set up process for a call between users with reduced set up times using one or more 3G telecommunication networks is provided. The method is provided between at least a pair of H.324-like terminals coupled to the one or more 3G telecommunication networks. The method includes establishing a bearer channel between a first terminal and a second terminal after a call signaling process and providing one or more modes of operation defined by a first FSS message. The one or more modes of operation include a codec configuration and a multiplexer table entry. The method also includes receiving, at the first terminal, the first FSS message transmitted from the second terminal and determining from the first FSS message, at the first terminal, that the second terminal is capable of receiving media prior to a response message from the second terminal being received at the first terminal. The method further includes transmitting media before the response message from the second terminal is received.

According to an alternative embodiment of the present invention, a method of transmitting information using one or more 3G telecommunication networks is provided. The method is provided between at least a pair of H.324-like terminals coupled to the one or more 3G telecommunication networks. The method includes providing the information at a first terminal and encoding the information for error robustness and to avoid emulation of one or more expected standard flags, thereby forming encoded information. The method also includes framing the encoded information with one or more flag sequences to form a framed sequence, padding the framed sequence, and transmitting the padded framed sequence.

Many benefits are achieved by way of the present invention over conventional techniques. For example, embodiments of the present invention provide for reductions in call set up time, thereby enhancing the customer experience. Moreover, embodiments of the present invention maintain compatibility with existing protocols. Depending upon the embodiment, one or more of these benefits, as well as other benefits, may be achieved. The objects, features, and advantages of the present invention, which to the best of our knowledge are novel, are set forth with particularity in the appended claims. The present invention, both as to its organization and manner of operation, together with further objects and advantages, may be best be understood by reference to the following description, taken in connection with the accompanying drawings.

BRIEF DESCRIPTION OF THE DRAWINGS

FIG. 1 illustrates the structure of the FSS frames according to an embodiment of the present invention;

FIG. 2 illustrates the structure of the FSS Frame Information field according to an embodiment of the present invention;

FIG. 3 illustrates the structure of the FSS Synchronization Flag according to an embodiment of the present invention;

FIG. 4 illustrates the structure of the Predefined Profile Index according to an embodiment of the present invention;

FIG. 5 illustrates the structure of the Detailed Profile Index in the Predefined Profile Index according to an embodiment of the present invention;

DETAILED DESCRIPTION OF THE INVENTION

Figure 6:
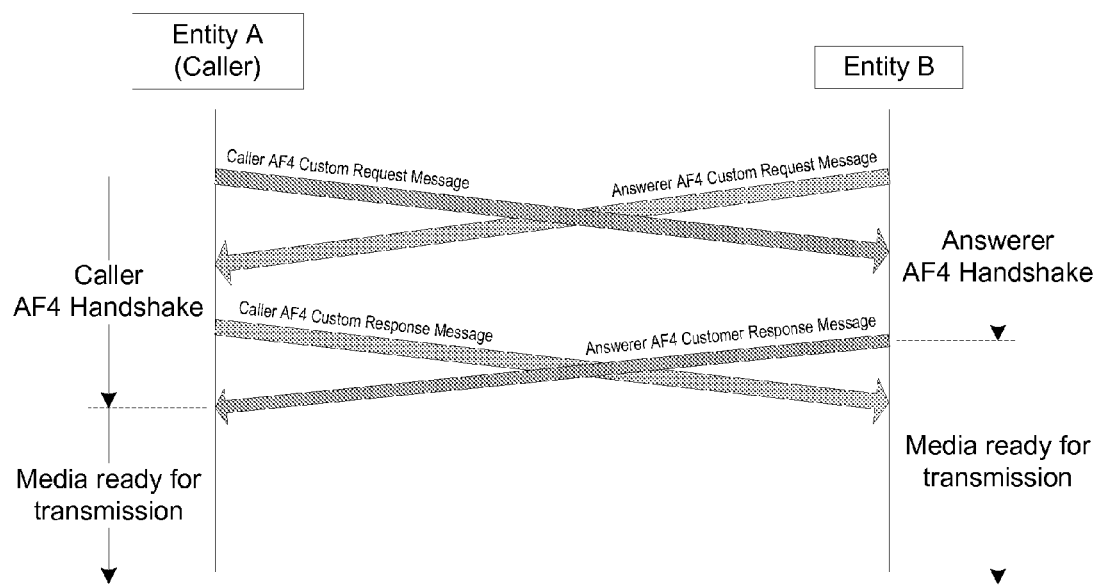
FIG. 6 illustrates communication of Request and Response messages according to an embodiment of the present invention.

The H.324M standard recommendation (H.324 recommendation with Annex C extension) has been adopted by the third generation partnership program (3GPP) as the 3G-324M technical specification for the provision of conversational videotelephony services over the circuit switched bearer of 3G networks. H.324 suffers from long session setup delays and, unlike H.323, has not benefited from enhancements for the fast establishment of video sessions. It is agreed within the industry that reducing session setup time will enhance the user's experience. According to embodiments of the present invention, methods and systems are provided that reduce session setup times in H.324, H.324M and 3GPP 3G-324M.

The establishment of a typical videotelephony session between two H.324M terminals requires the completion of several procedures such as mobile level detection and H.245 messaging.

The introduction of faster session setup techniques into H.324 will make setup times consistent with similar videotelephony protocols (H.323 and SIP) and will significantly enhance the user experience. Embodiments of the present invention provide for one or more additions or enhancements (e.g., one or more annexes) to the H.324 Recommendation and call setup procedures that allow media channels to be established in a fast and/or flexible manner, thereby reducing session setup times. For purposes of clarity, techniques described herein are referred to as Fast Session Setup (FSS), which was previously known as AnswerFast Type 4.

Bearer-Based Fast Session Setup Procedure

According to embodiments of the present invention, methods and systems are provided that include the fast session setup (FSS) procedure as an alternative procedure for establishing an audio and video communication session in H.324. The procedure transmits the preferred operation mode as the first bits transmitted on the bearer channel. Because these bits are prevented from emulating existing mobile level flags, including the base-line H.324 mode, they are ignored by existing terminals and hence maintains interoperability with existing terminals. The procedure allows significant reduction of the session setup time.

A fallback mechanism is described for the connecting terminals that do not support FSS.

Additional information related to applicable telecommunications standards is found, for example, in the following references, which are incorporated herein by reference in their entirety for all purposes.

[1] H.324 ITU-T Recommendation—Terminal for low bit-rate multimedia communication. 03/2002.

[2] 3GPP TS 24.008—Mobile radio interface layer 3 specification; Core Network Protocols.

[3] 3GPP TS 26.110—Codec for circuit switched multimedia telephony service; General description.

[4] 3GPP TS 26.111—Codec for circuit switched multimedia telephony service; Modifications to H.324.

Definitions caller: The terminal that originates the call (the calling terminal).

callee: The terminal that answers the call (the called terminal).

fallback: The procedure that is invoked when terminals abandon in the middle of the FSS procedure and proceed with session setup according to H.324 Annex C.

inferred common mode (ICM): The media mode that is determined by both terminals based on the local profile request and peer profile request (always the same for both terminals).

normal mobile level operation (NMLO): The normal operation of the H.223 multiplexer on the bearer channel. It is in Phase E of the terminal procedures with the transmission of MUX-PDUs at a given mobile level on the bearer channel. Phase D of the terminal procedures for H.245 message exchange will be started if FSS mode is not accepted.

re-proposal: The procedure to restart FSS with new request settings without a fallback to normal H.245 message exchange.

request frame: An FSS frame of the request type, specified in the Frames & Synchronization Flags section.

request message: An ASN.1 coded FSS request message contained in the FSS Request frame payload field. Alternatively other codings for the FSS request message could be used.

response frame: An FSS frame of the response type, specified in the Frames & Synchronization Flags section. Alternatively other codings for the FSS response message could be used.

response message: An ASN.1 coded FSS response message contained in the FSS Response frame payload field. Alternatively other codings for the FSS response message could be used.

session profile: A collection of specified values for all aspects of the multiplexer along with H.245 parameters for the codecs to be used and the logical channels to be opened. Profiles defining one or more aspects are also included herein, for example a session profile containing an audio profile and a multiplexer profile.

simultaneous determination: A mode for the FSS procedure in which both the connecting terminals determine the common mode for media channels (Inferred Common Mode) from their respective Fast Session Setup request messages.

Format Conventions

The numbering, field mapping and bit transmission conventions used in the present specification are consistent with those used in ITU-T V.42 and 3.2/H.223.

Terminals implementing the FSS procedure undergo the following phases:

Phase 1: Fast Session Setup

Phase 2: Media Exchange

A terminal can interrupt the FSS phase by transmitting standard mobile level sequence flags as described in C.6\H.324. The FSS phase may be repeated if desired.

In circuit-switched operation, for example 3GPP 3G-324M, the two connecting terminals should repeat the transmission of an FSS frame (Request or Response) while waiting to proceed to the next phase.

The Session Profiles can be predefined or explicitly expressed. The FSS Request and FSS Response messages are constructed according to the procedures described in the FSS Request Payloads and FSS Response Payloads sections below, respectively.

A terminal supporting FSS shall support Predefined Profiles. Support of Explicit Profiles is recommended. A tradeoff between speed and flexibility is provided by the predefined profiles included herein. As an example, standardized predefined profiles may increase session setup speed by providing a limited range of operating points. For terminals utilizing this technique, there exists a significant probability of selecting and transmitting using a predefined profile commonly shared with a peer terminal. Matching of these predefined profiles thus increases session setup speed. Explicit profiles are also included according to embodiments of the present invention and provide additional advantages including flexibility.

Predefined Profiles for FSS Procedure

Embodiments of the present invention provide a number of predefined profiles for FSS procedures. These predefined profiles include profiles for audio codecs, video codecs, multiplexer capability profiles, and multiplexer table entry profiles. Merely by way of example, the following particular predefined or preconfigured characteristics are provided herein:

```
Audio Profiles
    audioProfile 0 (0x0000)
        //G.723.1 Audio
            maxAL-sduAudioFrames= 1
            silenceSuppression=false
    audioProfile 1 (0x0001)
        //G.723.1 Audio
            maxAL-sduAudioFrames= 1
            silenceSuppression=true
    audioProfile 4096 (Ox 1000)
        // GSM-AMR Audio
            maxAl-sduFrames=1
            gsmEFRComfortNoise=false
            gsmIS641ComfortNoise=false
            gsmPdcEFRComfortNoise=false
Video Profiles
    videoProfile 0 (0x0000)
        // H.263 baseline - QCIF Video
            gcifMPI=2
            maxBitRate=240
            unrestrictedVector=false
            arithmeticCoding=false
            advancedPrediction=false
            pbFrames=false
            temporalSpatialTradeOffCapability=false
            errorCompensation=false
    videoProfile 128 (0x0080)
        // H.263 baseline 3G-324M
            gcifMPI=2
            maxBitRate=480
            unrestrictedVector=false
            arithmeticCoding=false
            advancedPrediction=false
            pbFrames=false
            temporalSpatialTradeOffCapabty=false
            errorCompensation=false
            advancedIntraCodingMode=true
            deblockingFilterMode=true
            improvedPBFramesMode=false
            unlimitedMotionVectors=false
            fullPictureFreeze=false
            partialPictureFreezeAndRelease=false
            resizingPartPicFreezeAndRe lease= false
            fullPictureSnapshot=false
            partialPictureSnapshot=false
            videoSegmentTagging=false
            progressiveRefinement=false
            dynamicPictureResizingByFour=false
            dynamicPictureResizingSixteenthPel=false
            dynamicWarpingHalfeel=false
            dynamicWarpingSixteenthPel=false
            independentsegmentDecoding=false
            slicesInOrder-NonRect=trueslicesInOrder-Rect=false
            slicesNoOrder-NonRect=false
            slicesNoOrder-Rect=false
            alternateInterVLCMode=false
            modifiedQuantizationMode=true
            reducedResolutionUpdate=false
            separateVideoBackChannel=false
            videoBadMBsCap=false
            dataPartitionedSlices=false
            fixedPointIDCTO=false
            interlacedFields=false
            currentPictureHeaderRepetition=false
            previousPictureHeaderRepetition=false
            nextPictureHeaderRepetition=false
            pictureNumber=false
            spareReferencePictures=false
    videoProfile 4096 (0x1000)
        // MPEG4-Video
            gcifMPI=2
            maxBitRate=4 8 0
            sliceResynchronization=false
            dataPartitioning=false
            reversibleVLC=false
            shortHeader=false
Multiplex Capability Profiles
    capabilityProfile 0 (0x0000)
        // H.324 default
            transportWithI-frames=false
            videoWithAL1=false
            videoWithAL2=false
            videoWithAL3=true
            audioWithAL1=false
            audioWithAL2=true
            audioWithAL3=false
            dataWithAL1=false
            dataWithAL2=false
            dataWithAL3=false
            maximumA12SDUsize=1024
            maximumA13 SDUsize=1024
            maximumDelayJitter=200
            h223MultiplexTableCapability=basic
        maxMUXPDUSizeCapability=false
        nsrpSupport=false
    capabilityProfile 256 (0x0100)
        // H.324/M default
            transportWithI-frames=false
            videoWithAL1=false
            videoWithAL2=false
            videoWithAL3=true
            audioWithAL1=false
            audioWithAL2=true
            audioWithAL3=false
            dataWithAL1=false
            dataWithAL2=false
            dataWithAL3=false
            maximumA12SDUsize=1024
            maximumA13SDUsize=1024
            maximumDelayJitter=200
            h223MultiplexTableCapability=basic
        maxMUXPDUSizeCapability=false
            nsrpSupport=true
            modeChangeCapability=false
            h223AnnexA=true
            h223AnnexADoubleFlag=false
            h223AnnexB=true
            h223AnnexBwithHeader=false
            videoWithAL1M=false
            videoWithAL2M=false
            videoWithAL3M=true
            audioWithAL1M=false
            audioWithAL2M=true
            audioWithAL3M=false
            dataWithAL1M=false
            dataWithAL2M=false
            dataWithAL3M=false
            alpduInterleaving=false
            maximumAL1MPDUSize=1080
            maximumAL2MSDUSize=4096
            maximumAL3MSDUSize=4096
    capabilityProfile 4096 (Ox 1000)
        // 3G-324M default
            transportWithI-frames=false
            videoWithAL1=false
            videoWithAL2=true
            videoWithAL3=true
            audioWithAL1=false
            audioWithAL2=true
            audioWithAL3=false
            dataWithAL1=false
            dataWithAL2=false
            dataWithAL3=false
            maximumA12SDUsize=1024
```

-continued

```
maximumAl3SDUsize=1024
maximumDelayJitter=200
h223MultiplexTableCapability=basic
maxMUXPDUSizeCapability=false
nsrpSupport=true
modeChangeCapability=false
h223AnnexA=true
h223AnnexADoubleFlag=false
h223AnnexB=true
h223AnnexBwithHeader=false
```

Multiplex Table Entries Profiles

Note Audio channels are represented as A1, A2, A3, ... Video channels are represented as V1, V2, V3, ...
```
multiplexProfile 0 (0x0000)
    1 = (LCN A1, RC UCF}
multiplexProfile 1 (0x0001)
    1 = (LCN V1, RC UCF}
multiplexProfile 16 (0x0010)
    1 = (LCN A1, RC UCF},
    2 = {LCN V1, RC UCF}
multiplexProfile 512 (0x0200)
    1 = {LCN A1, RC UCF},
    2 = (LCN V1, RC UCF},
    3 = {LCN A1, RC 251, {LCN V1, RC UCF}
    4 = {LCN A1, RC 221, (LCN V1, RC UCF}
    5 = {LCN A1, RC 5}, {LCN V1, RC UCF}
    6 = {LCN A1, RC 25}, {LCNO, RC UCF}
    7 = {LCN A1, RC 22}, {LCNO, RC UCF}
    8 = {LCN A1, RC 5), {LCNO, RC UCF}
multiplexProfile 513 (0x0201)
    1 = (LCN A1, RC UCF},
    2 = {LCN V1, RC UCF},
    3 = {LCN A1, RC 261, {LCN V1, RC UCF}
    4 = {LCN A1, RC 231, {LCN V1, RC UCF}
    5 = (LCN A1, RC 61, {LCN V1, RC UCF}
    6 = {LCN A1, RC 261, {LCNO, RC UCF}
    7 = {LCN A1, RC 231, {LCNO, RC UCF}
    8 = {LCN A1, RC 61, {LCNO, RC UCF}
multiplexProfile 528 (0x0210)
    1 = (LCN A1, RC UCF},
    2 = (LCN V1, RC UCF},
    3 = (LCN A1, RC 321, {LCN V1, RC UCF}
    4 = {LCN A1, RC 201, {LCN V1, RC UCF}
    5 = {LCN AI, RC 191, {LCN V1, RC UCF}
    6 = {LCN A1, RC 17}, {LCN VI, RC UCF}
    7 = {LCN A1, RC 151, {LCN V1, RC UCF}
    8 = {LCN A1, RC 141, {LCN V1, RC UCF}
    9 = {LCN A1, RC 71, {LCN V1, RC UCF}
    10 = {LCN A1, RC 2), {LCN V1, RC UCF}
    11 = {LCN A1, RC 321, {LCNO, RC UCF}
    12 = {LCN A1, RC 71, {LCNO, RC UCF}
    13 = (LCN A1, RC 21, {LCNO, RC UCF}
multiplexProfile 529 (0x0211)
    1 = {LCN A1, RC UCF},
    2 = {LCN V1, RC UCF},
    3 = (LCN A1, RC 331, {LCN V1, RC UCF}
    4 = {LCN A1, RC 21}, {LCN V1, RC UCF}
    5 = {LCN A1, RC 20}, {LCN V L, RC UCF}
    6 = (LCN A1, RC 18}, {LCN V1, RC UCF}
    7 = {LCN A1, RC-16}, {LCN V1, RC UCF}
    8 = {LCN A1, RC 151, {LCN VI, RC UCF}
    9 = {LCN A1, RC 8}, {LCN V1, RC UCF}
    10 = {LCN AI, RC 3}, {LCN VI, RC UCF}
    11 = (LCN AI, RC 33}, {LCNO, RC UCF}
    12 = (LCN A1, RC 8}, {LCNO, RC UCF}
    13 = {LCN A1, RC 3}, {LCNO, RC UCF}
```

In addition to these baseline profiles, proprietary profiles providing equivalent functionality are included according to embodiments of the present invention. These proprietary profiles will provide for increased service flexibility among other benefits. One of ordinary skill in the art would recognize many variations, modifications, and alternatives.

Frames & Synchronization Flags

The FSS Request and FSS Response frames are octet aligned and have the structure shown in FIG. 1.

The Frame Information (FI) field consists of 3-bit Frame Type (FT), followed by 3-bit Segment Sequence Number (SSN), followed by 1-bit for Last SSN (LS) flag, and followed by 1-bit Payload Marker (PM) flag. The bit allocation of the FI field is shown in FIG. 2.

The FT field has the values shown in Table 1, which provides a description of the Fast Session Setup Frame Type field.

TABLE 1

| Frame Type (FT) (3 bits) | Description |
| --- | --- |
| OxO | Request Frame Type |
| Ox1 | Response Frame Type |
| Ox2 ... 0x7 | Reserved |

The use of the SSN and the LS fields are specified in the FSS Payload Segmentation and Reassembly section below.

Referring to FIG. 2, the PM field if set to 1 indicates the presence of the Payload Length (PL) field. If set to 0, PL is not present and PL=O.

The Sequence Number (SN) field is present when LS is set to 1. It indicates the sequence number of an FSS Request or FSS Response frame. The number shall start from 0. For FSS Request, it indicates the total number of re-proposals for a request and counter-offers for any subsequent response(s). For FSS Response, it matches the SN of the received FSS Request associated with the Response, or is an increment of the SN modulo 256 of the received FSS Response.

The Payload Length (PL) field indicates the payload size in octets before applying emulation insertion octets. The FSS frame payload or FSS-PDU shall not exceed 150 octets. The receiver shall support the overall FSS-MDU payload length of up to 1050 octets excluding any octets inserted during the Flag Emulation Avoidance procedure described in the FSS Flag Emulation Avoidance section below.

The Payload, when present, corresponds to either a FastSessionSetupRequest message, a FastSessionSetupResponse message, or a single H.223 MUX-PDU. When the payload is present, the PM field shall be set to 1. The ASN.I definitions of the FastSessionSetupRequest and FastSessionSetupResponse messages and all other ASN.1 messages referred to in this annex are described in the ASN.1 Syntax for FSS Procedure section below, and are encoded according the Packed Encoding Rules (PER) as defined in ITU-T Rec. X.691.

The CRC (cyclic redundancy coding) field is 16 bits and is determined by applying the CRC to the entire frame excluding the FSS Synchronization Flags (see below). The CRC is as described in 8.1.1.6.1/V.42. The CRC is calculated before the FEA procedure described in the FSS Flag Emulation Avoidance section below.

On detecting a CRC error, the corresponding FSS frame shall be discarded.

For some implementations, some fields in the FSS frames are not fully utilized. These fields are populated with reserved bits or hard-coded values in some embodiments, thus reducing system complexity.

FIG. 3 illustrates the definition of the FSS Synchronization Flag as according to an embodiment of the present invention. Other flags are utilized in other embodiments, including standard multiplexer PDU framing for non-negotiated multiplexer table entries.

One FSS Synchronization Flag shall be inserted immediately before each FSS Frame and one FSS Synchronization Flag shall be inserted immediately after each FSS Frame. Only one FSS Synchronization Flag shall exist between two consecutive FSS Frames.

FSS Request Payloads

An FSS Request payload is represented by the ASN.1 FastsessionsetupRequest message and allows a terminal to use either a predefined session profile or an explicit session profile definition. In a particular embodiment, for terminals capable of using either predefined session profiles or explicit session profiles, a selection is made between either predefined or explicit session profiles based on one or more predefined rules or one or more preferences indicating a priority of profile type. Merely by way of example, two terminals capable of using both predefined and explicit profiles may choose to use explicit profiles. The selection of a profile will depend on the particular applications. The nonStandard field is a container to allow a non-Standard based FSS Request to be specified. Examples of the additional information that may be provided in the nonstandard field include a MultiplexTableEntry, a UserInputIndication, or a GenericCapability.

The predefinedProfile field contains the detailed settings of an FSS Request using the predefined profile approach and is described in the FSS with Predefined Profiles section below. The explicitProfile field contains the detailed settings of an FSS Request using the explicit profile approach and is described in the FSS with Explicit Profiles section below.

No MUX-PDUs shall be included as FSS Request payloads.

FSS Response Payloads

An FSS Response payload is represented by the FastSessionSetupResponse message and allows a terminal to use either a predefined session profile or an explicit session profile definition. The nonstandard field is a container to allow a non-Standard based FSS Response to be specified. The predefinedProfle field contains the detailed settings of FSS Response using the predefined profile approach and is described in the FSS with Predefined Profiles section below. The explicitProfile field contains the detailed settings of FSS Response using an explicit profile and is described in the FSS with Explicit Profiles section below.

Fast Session Setup Payload Segmentation and Reassembly (FSSPSR) Procedure

If a message data unit (FSS-MDU) size exceeds 150 octets, it shall be segmented into multiple sub-units called protocol data units (FSS-PDU). If an FSS-MDU directly maps to one FSS-PDU, without segmentation, the LS flag in the FI field of the FSS frame shall be set to 1. If an FSS-MDU maps into more than 1 segment, the LS flag shall be set to 0 except the last segment, which shall have the LS flag set to 1. The SSN shall be set to 0 for the first segment and monotonically incremented until the last segment, the maximum value of which is 6. The value 7 is reserved. All segments shall be sent at least once.

On receiving and reassembling an FSS-MDU, if one or more corresponding FSS-PDUs are received with error, the reassembling process should wait for the next repeated cycle of the FSS frame delivery before processing the reassembled FSS-MDU.

FSS Flag Emulation Avoidance

Before transmitting the FSS frames onto the bearer, a flag emulation avoidance (FEA) procedure shall be performed against synchronization flags for all mobile levels of H.324 (flags of mobile levels 0-3). The fields with Frame Information, Payload Length, Payload and CRC are included in the FEA procedure. All octets with values OxA3, 0x35, OxE1, Ox4D, 0x19, OxBI and Ox7E shall be duplicated by inserting adjacently an octet with the same value.

FSS with Predefined Profiles

According to embodiments of the present invention, methods and techniques are provided that include FSS with predefined profiles. For example, a predefined profile request payload is represented by the ASN.1 message FastSessionSetupPredefinedRequest which has the following fields:

version indicates the version number of the FSS Predefined Profile being used by the terminal transmitting the message. It shall be set to 1 for this release of the recommendation.

h245version indicates the version number of 1-1.245 being used by the terminal transmitting the message.

vendorId indicates the unique vendor identifier as adopted by ITU-T Rec. H.245 for the terminal transmitting the message.

terminalType indicates the terminal type number as specified in ITU-T Rec. H.324. It has the same value as the one used in H.245 master-slave determination signaling.entity.

initialMobileLevel indicates the starting maximum mobile level the originating terminal can support.

h223Info indicates H.223 specific settings supported. This includes h223AnnexADoubleFlag, h223AnnexBOptionalHeader and multiplexProfiles. h223AnnexADoubleFlag indicates the use of H.223 Annex A double flag mode for mobile level 1 either as an initial mobile level or the final mobile level. h223AnnexBOptionalHeader indicates the use of H.223 Annex B optional header mode for mobile level 2 or 3 either as an initial mobile level or the final mobile level. multiplexProfile indicates which predefined multiplex table profile is used by the terminal transmitting the message.

capabilityProfile indicates which predefined multiplex capability profile is used by the terminal transmitting the message audioProfiles contains a list of predefined audio profiles ordered in the preference of use. In other embodiments, the list of predefined audio profiles are unordered and are used to express capabilities rather than preference of use.

videoProfiles contains a list of predefined video profiles ordered in the preference of use. In other embodiments, the list of predefined video profiles are unordered and are used to express capabilities rather than preference of use.

dataApplicationProfiles indicates a list of predefined data application profiles ordered in the preference of use. This parameter is reserved and shall not be used. On receiving this parameter, it shall be ignored.

encryptionProfiles contains a list of predefined encryption profiles ordered in the preference of use. This parameter is reserved and shall not be used. On receiving this parameter, it shall be ignored. In other embodiments, the list of predefined encryption profiles are unordered and are used to express capabilities rather than preference of use.

additionalParameters contains a list of predefined miscellaneous profiles including non-standard profiles ordered in the preference of use. This parameter is reserved and shall not be used. On receiving this parameter, it shall be ignored.

mediaTunnel, when set to TRUE, indicates that the terminal may accept media tunneled as payload of any FSS Response. When set to FALSE, the terminal does not support media payload in any FSS Response. In an embodiment in which mediaTunnel is set to TRUE, a terminal is preferably adapted to immediately receive media. Buffering of media, for example, in a receiving terminal may be performed to accommodate either message processing time or message corruption/loss of a capability set preference, or response, if sent, and the like. Accordingly, in the event of loss of, for example, a capability set preference, or response, sent by a peer terminal, a terminal receiving media will buffer the media until a repeated capability set preference, or response, message is received from the peer terminal.

modeDetermination, when set to byCallee, the answering terminal decides the mode of operation and transmits the information of the mode in its FSS Response frame to the caller. When set to simultaneous, the session profile is determined by both terminals as the inferred common mode.

Predefined Profile Response Payload

For FSS simultaneous determination, a predefined profile response should not contain any message payload. If it does, the message payload may be ignored.

For FSS non-simultaneous determination mechanism, the predefined profile response consists of the FastSessionSetup-Predefinedresponse ASN.1 message payload which has the following fields:

version, h245version, vendorId, terminalType and capabilityProfile have the same meaning as described above.

mobileLevel indicates the final selected common mobile level between the two connecting terminals. The selection is identical to C.6.2 except the transmission of stuffing flags does not apply.

h223Info indicates H.223 specific settings supported. This includes h223AnnexADoubleFlag, h223AnnexBOptionalHeader, and multiplexProfile. h223AnnexADoubleFlag indicates the use of H.223 Annex A double flag mode for mobile level 1 as the final mobile level. h223AnnexBOptionalHeader indicates the use of H.223 Annex B optional header mode for mobile level 2 or 3 as the final mobile level. multiplexProfile indicates which predefined multiplex table profile is used by the terminal transmitting the message.

audioProfiles contains a list of predefined audio profiles for both media directions. The list should contain at least one audio channel path for outgoing direction and one for incoming direction, which is indicated by the MDI in a PPI. For example, for a bidirectional audio channel, at least one audio profile should be specified. If the list consists of unidirectional audio channels, one in each media direction, then at least two audio profiles should be specified.

videoProfiles contains a list of predefined video profiles for both media directions. The list should contain at least one video channel path for outgoing direction and one for incoming direction, which is indicated by the MDI in a PPI. For example, for a bidirectional video channel, at least one video profile should be specified. If the list consists of unidirectional video channels, one in each media direction, then at least two video profiles should be specified.

dataApplicationProfiles contains a list of predefined data application profiles for both media directions. The list should contain at least one data application channel path for outgoing direction and one for incoming direction, which is indicated by the MDI in a PPI. For example, for a bidirectional data application channel, at least one data application profile should be specified. If the list consists of unidirectional data application channels, one in each media direction, then at least two data application profiles should be specified. This parameter is reserved and shall not be used. On receiving this parameter, it shall be ignored.

encryptionProfiles contains a list of predefined encryption profiles for both media directions. The list should contain at least one encryption channel path for outgoing direction and one for incoming direction, which is indicated by the MDI in a PPI. For example, for a bidirectional encryption channel, at least one encryption profile should be specified. If it consists of unidirectional encryption channels, one in each media direction, then at least two encryption profiles should be specified. This parameter is reserved and shall not be used. On receiving this parameter, it shall be ignored.

additionalParameters contains a list of predefined miscellaneous profiles including non-standard profiles. This parameter is reserved and shall not be used. On receiving this parameter, it shall be ignored.

Predefined Profiles and Indices

A predefined profile makes use of a single index, called predefined profile index (PPI) to represent a whole set of predefined parameters for audio codec, video codec, multiplex capability, and multiplex entry table. It also includes a media direction index (MDI) for each media type. In other embodiments, subsets of these profiles are utilized as appropriate to the particular application. For example, a predefined profile may represent an audio codec of a specific configuration or an entire channel state pertaining to a logical channel.

Baseline profiles for audio codec, video codec, multiplex capability, and multiplex entry table are defined in this recommendation. These baseline profiles are specified in the Predefined Profiles for FSS Procedure section above. Additional profiles can be added through normal standardization procedures.

FIG. 4 illustrates the structure of the PPI according to an embodiment of the present invention. As shown in FIG. 4, a PPI is represented by a 16-bit value. The 3 most significant bits (MSBs) (bit 16 to bit 14), represent the Media Direction Index (MDI) as described in the Media Channels with Different Media Directions and Adaptation Layer Types section. The remaining 13 least significant bits (LSBs) (bit 13 to bit 1) represent the Detailed Profile Index (DPI). The values PPI with the pattern Ox [3,5,7,9,B,D,F]FFF are reserved.

In the DPI, the 5 MSBs (bit 13 to bit 9) represent the DPI profile category index (DPI-CI) which has either the media type for the case of media, the multiplex capability category for the case of multiplex capability, or the multiplexing category for the case of multiplex entry table. The 8 LSBs (bit 8 to bit 1) are the unique identifier for a profile of the particular media, multiplex capability or multiplex entry table, called profile identifier (DPI-PID).

Table 2 illustrates the ranges of the DPI-CI according to an embodiment of the present invention.

TABLE 2

H.324 - Ranges of Category Index (DPI-CI) in a DPI.

| DPI-CI Values (bit 13 to bit 9) | Description |
|---|---|
| 0~15 | Baseline media for media covered by ITU-T Rec. H.324. |
| 16~19 | Baseline media for media covered by Recommendations other |

TABLE 2-continued

H.324 - Ranges of Category Index (DPI-CI) in a DPI.

| DPI-CI Values (bit 13 to bit 9) | Description |
|---|---|
| 20~29 | Media registered with profile index assignment authority. |
| 30 | Reserved |
| 31 | Reserved |

Table 3 illustrates the ranges of the DPI-PID for the DPI-CI with values smaller than 20 according to an embodiment of the present invention.

TABLE 3

H.324 - Ranges of Category Index (DPI-CI) in a DPI.

| DPI-PID Values (bit 8 to bit 1) | Description |
|---|---|
| 0~31 | Baseline media profile settings targeting to ITU-T Rec. H.324. |
| 32~126 | Media profiles targeting to ITU-T Rec. H.324, registered with profile index assignment authority. |
| 127 | Reserved |
| 128~159 | Baseline media profile settings targeting to Recommendations other than ITU-T Rec. H.324. |
| 160~253 | Media profiles targeting to Recommendation other than ITU-T Rec. H.324, registered with profile index assignment authority. |
| 254 | Reserved |
| 255 | Reserved |

FIG. 5 illustrates a structure of the DPI in the PPI according to an embodiment of the present invention.

The definition of the ITU-T Rec. H.324 and 3GPP 3G-324M session profiles may be extended in separate documents from time to time. The defined baseline profiles are described in the Predefined Profiles for FSS Procedure section above.

Multiple media channels of the same and different media types can be supported by the use of the PPI separator with the value of 0xIFFF as one capability descriptor. By itself, a PPI separator indicates to use the same set of media preference specified immediately before. Otherwise, an additional set of media preference may follow the PPI.

Predefined Audio Profiles

The 5-bit DPI-CI for the audio codec type defines the codecs as shown in Table 4.

TABLE 4

H.324 - Definitions of predefined audio codec types.

| Values | Media Type |
|---|---|
| 0 | G.723.1 |
| 1 | G.711 |
| 16 | AMR (AMR-NB) |
| 17 | AMR-WB |

Details of baseline predefined audio profiles are defined in the Predefined Profiles for FSS Procedure section above.

Predefined Video Profiles

Table 5 illustrates definitions of predefined video codec types according to an embodiment of the present invention. As shown in Table 5, a 5-bit DPI-CI for the video codec type is utilized in a particular embodiment.

TABLE 5

Definitions of predefined video codec types.

| Values | Media Type |
|---|---|
| 0 | H.263 |
| 1 | H.261 |
| 16 | MPEG4-Video |
| 17 | H.264 |

Details of baseline predefined video profiles are defined in the Predefined Profiles for FSS Procedure section above.

Multiplex Capability Profiles

The 5-bit DPI-CI for the multiplex capability defines the multiplex capability profiles shown in Table 6.

TABLE 6

H.324 - Definitions of predefined multiplex capability profiles.

| Values | Multiplex Capability Category |
|---|---|
| 0 | Baseline H.324 settings |
| 1 | H.324/M settings |
| 16 | Settings for systems other than ITU-T H.324, such as 3G-324M. |

Details of baseline predefined multiplex capability profiles are defined in the Predefined Profiles for FSS Procedure section above.

Multiplex Table Entries Profiles

The 5-bit DPI-CI for the multiplex entry table type defines the multiplex table profiles shown in Table 7.

TABLE 7

H.324 - Definitions of predefined multiplex table profiles.

| Values | Multiplex Table Profile |
|---|---|
| 0 | For logical channels without multiplexing. |
| n ( = 1–14) | For n logical channels plus logical channel 0 with multiplexing. |

Logical channels are pre-assigned. For one or more audio channels, the logical channel numbers are 1 (A1), 17 (A2), 33 (A3), . . . .

For one or more video channels, the logical channel numbers are 2 (V 1), 18 (V2), 34 (V3), . . . .

For one or more data application channels, the logical channel numbers are 3 (D1), 19 (D2), 35 (D3), . . . .

For one or more non-standard channels, the logical channel numbers are 4 (01), 20 (02), 36 (03), . . . .

The maximum number of predefined entries for any multiplex table PPI is 13.

Details of baseline predefined multiplex table profiles are defined in Appendix IV.2.4.

FSS Predefined Profiles Exchange Procedure

Once the bearer is established, if a terminal supports FSS, it shall immediately send an FSS Request frame. The frame should be repeated until one of the following conditions occurs, depending on whether simultaneous determination is invoked:

An FSS Request frame is detected at the callee for non-simultaneous determination; an FSS Request frame is detected for simultaneous determination;

An FSS Response frame is detected;

A valid mobile level stuffing flag is detected, as described in C.6\H324;

Timer T401 expiry.

In some embodiments of the present invention, the FSS Response frame is used as an Ack only and not to define operating conditions. In this case, it is not necessary for the receiving terminal to send further FSS frames.

When valid mobile level stuffing flags are detected or when timer T401 expires before detecting a valid FSS frame, normal H.324 session procedure shall be used according to Annex C. This is also referred to as FSS fallback.

When an FSS Request is detected, the payload is processed.

If the payload is decoded successfully, the terminal accepts it by sending an FSS Response frame. An FSS Response itself may incorporate message payload data or media payload data depending on the modeDetermination and mediaTunnel flags in the FSS Request defined in the modeDetermination section and the mediaTunnel Mode section. The frame may be immediately repeated, except the payload field for the media payload data, until one of the following situations occurs:

An FSS Response with the same SN is detected;
An FSS Request frame with a new monotonically incremented SN modulo 256 is detected;
An FSS Response frame with a new monotonically incremented SN modulo 256 is detected during FSS re-proposal;
Standard mobile level sequence flags are detected, as described in C.6\H.324;
Timer T401 expiry.

For the master-slave determination, the caller shall be the master when the terminalType fields in the FSS Request frames of the two terminals are identical. When the terminalType fields differ, the terminal which has higher terminalType value shall be the master.

A terminal indicates its capability to accept media tunneled in any FSS Response by setting the mediaTunnel to TRUE, according to the mediaTunnel Mode section below.

After an FSS Response has been sent, and a non-counter-offered FSS Response (Response Counter-Offer Procedure) has been detected and accepted, the terminal shall begin NMLO using the agreed mobile level. Audio and video exchange as determined by the ICM or from the accepted FastSessionSetupPredefinedResponse shall also start immediately if they have not already started during the FSS Response phase. Audio and video exchange shall continue seamlessly if they have been started during the FSS Response phase.

After an FSS Request has been detected, the terminal may decide not to proceed with the FSS procedure. It shall follow the procedure described in the Fast Session Setup Fallback Procedure Specification Section.

After an FSS Request has been sent and an FSS Request has been detected, if the terminal does not detect an FSS Response frame, but detects valid mobile level stuffing flags, the terminal shall follow the procedure described in the Fast Session Setup Fallback Procedure Specification Section.

After receiving a FastSessionSetupPredefinedResponse, if the terminal does not accept the response but prefers to perform a modified request, it may follow Request Re-Proposal Procedure described in the Request Re-Proposal Procedure section. If the terminal does not accept the response but prefers to offer a counter-response, it may follow the procedure described in the Response Counter-Offer Procedure Section.

On receiving FSS Response without message payload before receiving FSS Request at the beginning of the FSS procedure, the FSS Response to be transmitted shall have the SSN set to 7. On receiving an FSS Response without message payload and with SSN set to 7, the terminal shall reset to restart the media bitstream generation what NMLO begins. Transmission of media tunneled in the FSS Response frames may be ignored.

On receiving unexpected FSS frames, they shall be ignored.

modeDetermination

When the modeDetermination field in FastSessionSetupPredefinedRequest is set to bycallee by either or both terminals, the callee transmits in its FastSessionSetupPredefinedResponse the selected logical channels in the form of PPIs for both directions within the capabilities of both terminals. The caller shall send an FSS Response frame without message payload only after receiving FastSessionSetupPredefinedResponse from the callee.

When the modeDetermination fields in FastSessionSetupPredefinedRequest from both terminals are set to simultaneous, the ICM is determined by both terminals according to logical channel selection in C.4.1.3/H.245 and C.5.1.3/H.245 with the information described in the Media Channels With Different Media Directions And Adaptation Layer Types section below. The FSS Response frames of both terminals shall not include any message payload on accepting the ICM. In another embodiment, the FSS Response frames are not transmitted and media sent using the ICM is interpreted as an acknowledgement of successful session setup.

mediaTunnel Mode

The mediaTunnel flag in FastSessionSetupPredefinedRequest is set by a terminal to indicate its capability in receiving media tunneled in FSS Response frames. If a terminal is not operating in the mediaTunnel mode, the terminal will preferably wait to receive an FSS Response message before transmitting media.

When mediaTunnel from a terminal is set to TRUE, the peer terminal may tunnel media data in its FSS Response frames which do not require message payload. The terminal tunneling the media shall transmit one H.223 MUX-PDU in accordance with the ITU-T Rec. H.223 using the finally agreed mobile level as the payload of an FSS Response frame without any mobile flags. FSSPSR shall not be applied to the media payload. MUX-PDUs shall be sent in sequence, until the completion of the FSS Response phase and the start of the normal media transmission phase (NMLO). When a terminal sets mediaTunnel in its FastSessionSetupPredefinedRequest to FALSE, the peer terminal shall not tunnel any media in its FSS Response frames.

Request Re-Proposal Procedure

A terminal may choose to re-propose a new FSS Request instead of a fallback as described in the Fast Session Setup Fallback Procedure Specification Section.

When the modeDetermination field in FastSessionSetupPredefinedRequest of both terminals is set to simultaneous, and a terminal does not accept the FSS Request from the peer terminal, it may re-propose a new FSS Request by incrementing the SN in the FSS Request frame by 1 modulo 256 with the new request settings. If both terminals re-propose a new FSS Request simultaneously, simultaneous determination mode continues to be adopted provided that modeDetermination is set simultaneous by both terminals. If both terminals re-propose a new FSS Request simultaneously and either terminal set modeDetermination to byCallee, non-simultaneous determination shall be adopted.

A simultaneous determination re-proposal mode may be repeated until an inferred common mode (ICM) can be determined by both terminals, or until a terminal decides to follow the fallback procedure described in the Fast Session Setup Fallback Procedure Specification Section. A simultaneous determination re-proposal mode may be followed by a non-simultaneous determination mode but not vice versa.

When at least one terminal sets the modeDetermination to bycallee in FastSessionSetupPredefinedRequest, and the answering terminal does not accept the FSS Request from the caller for the first attempt, the answering terminal may re-propose its request by incrementing the SN in the FSS Request frame by 1 modulo 256 with the new request settings. When the caller accepts the FSS Request by the answering terminal, it shall respond to the answering terminal by sending the FSS Response with the SN in the FSS Response frame matching that of the FSS Request frame with the final selection. When the caller does not accept the FSS Request by the answering terminal, the caller may re-propose its request by incrementing the SN in the FSS Request frame by 1 modulo 256 with the new request settings.

If a terminal does not accept an FSS Response, it may re-propose a new FSS Request as described above, or counter propose a new FSS Response as described in the Response Counter-Offer Procedure Section.

The non-simultaneous determination mode may be repeated until both terminals can accept a common mode initially selected by the callee, or subsequently selected by one of the terminals, or until a terminal decides to follow the fallback procedure described in the Fast Session Setup Fallback Procedure Specification Section.

Response Counter-Offer Procedure

This procedure applies to non-simultaneous determination only. A terminal may choose to counter-offer with a new FastSessionSetupPredefinedResponse after receiving an FastSessionSetupPredefinedResponse from the peer terminal instead of re-proposing a new FastSessionSetupPredefinedRequest as described in the Request Re-Proposal Procedure section or fallback as described in the Fast Session Setup Fallback Procedure Specification section.

The new counter proposed FastSessionSetupPredefinedResponse shall be set with the SN in the FSS Response frame incrementing by 1 modulo 256 from the SN in the last FSS Request frame received. The determination of the FastSessionSetupPredefinedResponse shall be based on the message content of the received FastSessionSetupPredefinedResponse with the adjustment of the media channel directions from all currently proposed channel profiles. The received FastSessionSetupPredefinedResponse is modified by the removal of the channels that it cannot accept and the addition of the channels that it can support.

FSS with Explicit Profiles

FSS Explicit Profile Request

The explicit profile request is represented by the FastSessionSetupExplicitRequest ASN.1 message which has the following fields:

version indicates the version number of the FSS Explicit Profile being used by the terminal transmitting the message.

h245version, vendorId, terminalType, initialMobileLevel, mediaTunnel and modeDetermination have the same meaning as in the Predefined Profile Request Payload section.

h223Info indicates H.223 specific settings support. This includes h223AnnexADoubleFlag, h223AnnexBOptionalHeader, and multiplexEntrySend. h223AnnexADoubleFlag and h223AnnexBOptionalHeader have the same meaning as in the Predefined Profile Request Payload section. multiplexEntrySend indicates the multiplex entry table to be used by the terminal transmitting the message and is specified according to H.245.

multiplexCapability indicates the multiplex capability to be used by the terminal transmitting the message and is specified according to H.245.

openLogicalChannels contains a list of media channels in both directions to be used ordered by preference and are specified according to H.245. Media include audio, video, data application and encryption.

additionalParameters contains a list of H.245 messages encoded in ASN.I according to H.245. The list may include additional information, requests and non-standard H.245 messages ordered in the preference of use.

FSS Explicit Profile Response

For FSS simultaneous determination mechanism, the explicit profile response does not contain any payload.

For FSS non-simultaneous determination mechanism, the explicit profile response is represented by the FastSessionSetupExplicitResponse ASN.1 message which has the following fields:

version, h245version, vendorId and terminalType have the same meaning as in the Predefined Profile Request Payload section.

mobileLevel has the same meaning as in the Predefined Profile Response Payload section.

h223Info indicates H.223 specific settings support. This includes h223AnnexADoubleFlag, h223AnnexBOptionalHeader and multiplexEntrySend. h223AnnexADoubleFlag and h223AnnexBOptionalHeader have the same meaning as in the Predefined Profile Response Payload section. multiplexEntrySend has the same meaning as in the FSS Explicit Profile Request section.

multiplexCapability and additionalParameters have the same meaning as in the FSS Explicit Profile Request section.

openLogicalChannels contains a list of media channels selected for both media directions and are specified according to H.245. Media include audio, video, data application and encryption.

additionalParameters contains a list of H.245 messages encoded in ASN.1 according to H.245. The list may include additional information, responses to requests indicated in the additionalParameters in the corresponding FastSessionSetupExplicitRequest message, and non-standard H.245 messages ordered in the preference of use.

FSS Explicit Profile Request and Response Exchange Procedure

When two connecting terminals utilize FSS Explicit Profiles, the FSS Explicit Profile Request and Response procedure is identical to the procedure described in the FSS Predefined Profiles Exchange Procedure section with all occurrences of predefined profile and FastSessionSetupPredefinedResponse to be replaced by explicit profile and FastSessionSetupExplicitResponse respectively.

The interworking of predefined and explicit profiles is described in the Interworking between FSS Predefined Profiles and FSS Explicit Profiles section.

Logical Channel Numbers

Logical channel numbers are assigned by the message originator in H.245 OpenLogicalChannel request messages. For the case of bidirectional logical channels, only the forward logical channel number can be specified. The reverse logical channel number shall be the same as the forward logical channel number. In an embodiment, if a reverse logical channel number is already assigned, the next available logical channel number will be assigned. The highest logical channel number will be 14, and any OpenLogicalChannel number requests that lead to a logical channel number exceeding 14 will be ignored.

The multiplex table entries as defined in H.245 MultiplexEntrySend request message should match with the assigned logical channel numbers.

modeDetermination Mode

The procedure is identical to modeDetermination with all occurrences of FastSessionSetupPredefinedRequest and FastSessionSetupPredefinedResponse to be replaced by FastSessionSetupExplicitRequest and FastSessionSetupExplicitResponse respectively, and PPI by H.245 OpenLogicalChannels.

mediaTunnel Mode

The procedure is identical to mediaTunnel Mode with all occurrences of FastSessionSetupPredefinedRequest to be replaced by FastSessionSetupExplicitRequest.

Request Re-Proposal Procedure

The procedure is identical to 18.7 with all occurrences of FastSessionSetupPredefinedRequest to be replaced by FastSessionSetupExplicitRequest.

Response Counter-Offer Procedure

The procedure is identical to the Response Counter-Offer Procedure with all occurrences of FastSessionSetupPredefinedRequest and FastSessionSetupPredefinedResponse to be replaced by FastSessionSetupExplicitRequest and FastSessionSetupExplicitResponse respectively.

Interworking between FSS Predefined Profiles and FSS Explicit Profiles

When two terminals use different profile exchange modes (Predefined and Explicit) and only one terminal supports both Predefined and Explicit Profiles exchange procedures, a terminal that decodes and supports the received profile type should resend the FSS Request with modeDetermination set to byCallee using the same profile type as that it received and follow the procedure described in the FSS Predefined Profiles Exchange Procedure or the FSS Explicit Profile Request and Response Exchange Procedure sections. If the callee understands both Predefined and Explicit Profiles, it may skip to send the FSS Request and send the FSS Response. Alternatively, if the callee understands both profiles, a selection may be made to select a preferred profile exchange mode. The preferred profile exchange mode process may select a mode that is the same as or different than the mode originally transmitted by the callee. Additionally, in an alternative embodiment, the callee selects both Predefined and Explicit Profiles for initial transmission. Merely by way of example, if the callee originally transmitted Predefined profiles and then determined that the caller preferred Explicit Profiles, the callee may select to switch modes from Predefined Profiles to Explicit Profiles. A terminal that cannot decode or support the profile type it received, should continue to repeat sending the same FSS Request. The procedures specified in the FSS Predefined Profiles Exchange Procedure or the FSS Explicit Profile Request and Response Exchange Procedure sections should be followed accordingly. Only non-simultaneous determination shall be used.

When two terminals use different profile exchange modes and both terminals support both the FSS Predefined Profiles and FSS Explicit Profiles, a terminal that decodes and supports the received profile type should either send an FSS Response with a message payload (non-simultaneous determination) or resend the FSS Request with modeDetermination set to byCallee using the same profile type as that it received and follow the procedure described in the FSS Predefined Profiles Exchange Procedure or FSS Explicit Profile Request and Response Exchange Procedure sections.

Since both terminals can decode both profile modes, the callee shall ignore the FSS Response it received. If the callee sent the FSS Response and receives the resent FSS Request frames, it shall ignore the FSS Request it received. If the callee sent the FSS Request and receives the resent FSS Request frames, it shall decide which mode of profile it will use and follow the procedure described in the FSS Predefined Profiles Exchange Procedure or FSS Explicit Profile Request and Response Exchange Procedure sections. If the caller receives the FSS Response frames, it shall handle the FSS Response frame according to the FSS Predefined Profiles Exchange Procedure or FSS Explicit Profile Request and Response Exchange Procedure sections.

Interworking Request Re-proposal Procedure

A terminal may choose to re-propose a new FSS Request instead of fallback as described in the Fast Session Setup Fallback Procedure Specification section.

When at least one of the two terminals using different profile types can interpret the received request, but does not accept the FSS Request from the peer terminal, the terminal may send a new FSS Request using the same profile type as the peer terminal according to FSS Predefined Profiles Exchange Procedure or FSS Explicit Profile Request and Response Exchange Procedure and with the SN in the FSS Request frame incremented by 1 modulo 256. The procedures as described in the Interworking between FSS Predefined Profiles and FSS Explicit Profiles section should be followed.

Fast Session Setup Fallback Procedure Specification

An H.324 entity which supports FSS shall support the fallback procedure when the peer H.324 entity does not support FSS or transmits the mobile level flags before the completion of the FSS procedure.

If a terminal does not receive an FSS Request but has detected a normal start up procedure with a normal H.245 TerminalCapabilitySet message at an agreed initial mobile level, it shall assume that the peer terminal does not support FSS, or has not accepted any of the specified FSS profiles. In this case, the terminal shall stop transmitting FSS frames and continue to use the conventional TerminalCapabilitySet, MasterSlaveDetermination, MultiplexEntrySend and OpenLogicalChannel procedures to establish the session.

If a terminal detects a normal start up procedure with a normal H.245 TerminalCapabilitySet message at an agreed initial mobile level, no matter if the terminal has completed the FSS procedure, it shall consider the peer terminal has proceeded the FSS fallback. In this case, the terminal shall ignore the FSS outcome and start the conventional TerminalCapabilitySet, MasterSlaveDetermination, MultiplexEntrySend and OpenLogicalChannel procedures to establish the session.

If a terminal does not detect a valid FSS frame or normal start up procedure within the timer T401, it should assume that the peer terminal does not support FSS and fallback to continue normal H.324 session procedure according to Annex C.

If a terminal receives an FSS Request or Response without the PPI being understood, it shall initiate the FSS fallback procedure according to the descriptions in this section.

If audio and video coding processes were started during transmission of the FSS Response frames, they should be reset to restart their bitstream generation.

Terminal Procedures

The steps for provision of communication are as listed in clause C.5 with the following modifications:

Phase D: Fast Session Setup phase, as specified in this annex, is inserted before the level set-up procedure. If FSS is completed successfully, H.245 message exchange is skipped and logical channels operate immediately. If FSS fallback occurs, the connection continues from initial mobile level setup phase.

Media Channels with Different Media Directions and Adaptation Layer Types

This clause applies to predefined profile approach only. Media channel types are governed by the following fields:

1. Adaptation layer support per data type. The field is already covered within multiplex capability profile.
2. Media direction capability.
3. Media direction mode.

For adaptation layer support, the settings are used to influence the final logical channels to be opened between two connecting terminals. The adaptation layer support follows the following order of preference for each media type:

1. Media over AL 1
2. Media over AL2
3. Media over AL3

For example, if Video over AL2 and Video over AL3 are both supported, then Video over AL2 is the preference, and is selected if the peer terminal can also support it.

In FSS, adaptation layers always use the setting as specified below:

AL 1: framed or unframed depending on the media type. For all audio and video data types over AL 1, AL 1 shall be set to use framed mode.

AL2: with sequence number.

AL3: with 7-bit sequence number. Send buffer size is set to the recommended value as specified by the appropriate recommendation. Use of optional retransmission mode is left to the implementers.

Determination of the final logical channels to be opened follows normal open logical channel request, which could involve one or more request re-proposals and/or response counter-offers. The final decision is the outcome for the predefined profile approach.

The decision is calculated from the media direction capability with adaptation layer support and further information on the media direction mode to determine the final media mode settings. In normal situations, the predicted media modes determined from all combinations of requests should be unique. In case of discrepancy, either one or more re-proposals of the request may be performed as described in the Request Re-Proposal Procedure sections or the Interworking Request Re-Proposal Procedure section, or FSS fallback is used, as described in the Fast Session Setup Fallback Procedure Specification Section.

Mote that when a predictable conflict occurs, the master terminal looks at its preferred media list first to work out the final media to open.

Media Direction Index (MDI) is primarily used in FSS predefined profile approach. In addition, note also that the following logical channel settings are invalid:

1. Bidirectional AL2 channel with reverse nullData.
2. AL3 without specifying reverse parameter when the number of control field octets is greater than 0.

Note however that the following logical channel setting is valid:

1. Bidirectional AL2 channel with forward nullData.

All valid combinations of media direction capability and mode forming the MDI are listed in Table 8.

TABLE 8

H.324 - Definitions of Media Direction Index (MDI).

| Media direction capability | Media direction mode | Media Direction Index (MDI) |
|---|---|---|
| receiveCapability | transmitMode | 0 |
| | transmitAndReceiveMode | 1 |
| | noTransmitMode | 2 |
| transmitCapability | transmitMode | 3 |
| | noTransmitMode | 4 |
| receiveAndTransmitCapability (Symmetric) | transmitMode | 5 |
| | transmitAndReceiveMode | 6 |
| | noTransmitMode | 7 | transmitMode refers to the use of unidirectional logical channel. For the case of using adaptation layer 3 (AL3), this refers to the use of bidirectional logical channel with reversed logical channel parameter set as NULL.

transmitAndReceiveMode refers to the use of bidirectional logical channel. This is independent of the adaptation layer type to be used.

noTransmitMode refers to the possible use of unidirectional logical channel for incoming media direction. It will not start any logical channel for any direction unless signaled by the remote.

As shown in Table 8, a terminal may operate in one or more modes of operation for a given channel. According to embodiments of the present invention, a channel may operate in different modes for transmit and receive. That is, a channel may transmit media in a first mode and receive media in a second mode (i.e., noTransmitMode). In another embodiment, the modes are symmetric, being the same for both transmit and receive. Thus, merely by way of example, sending a FSS Request with video profile of H.263 with receiveCapability of notransmitMode (MDI=2) and video profile of MPEG-4 with transmitCapability of transmitMode MDI=3). Thus, this exemplary terminal would result in an asymmetric session transmitting MPEG-4 media and receiving H.263 media. Accordingly, the peer terminal would provide matching video profiles in its FSS Request: transmit H.263 and receive MPEG-4.

An embodiment of the present invention is illustrated in FIG. 6, where the Equipment Preferred modes (Request and Response messages shown in FIG. 6) are transmitted on the bearer channel. The Equipment Preferred modes can be similar to that described in the Type III embodiment section of U.S. patent application Ser. No. 10/934,077 and can be an explicit description of preferred modes or a coded (index for look-up in a table of common modes).

Figure 7A:
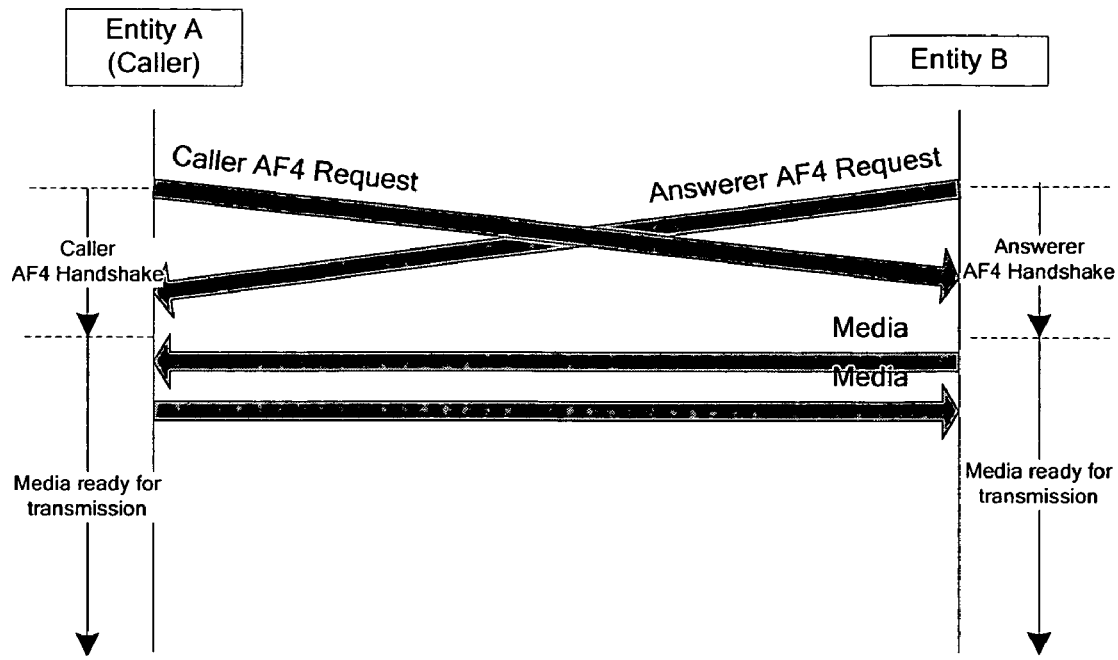
FIGS. 7A and 7B illustrate an embodiment of the Type IV speed-up technique according to the present invention.
Figure 7B:
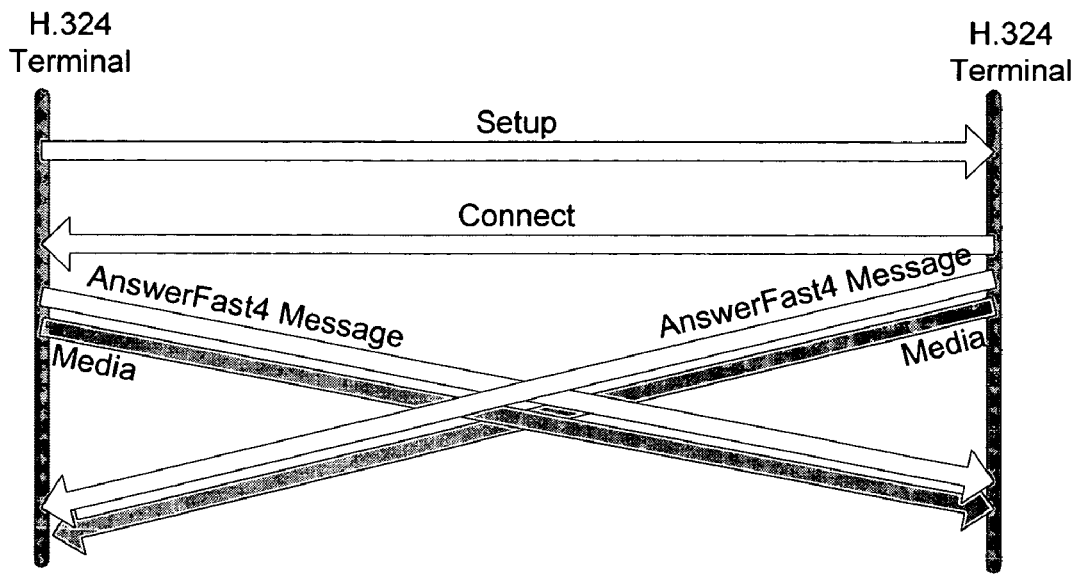

FIG. 7A is a simplified diagram illustrating AnswerFast4 according to another embodiment of the present invention. In this case, inference or a preference rule set is used at each terminal and the optional response message is not required to be sent before media transmission may begin. FIG. 7B is a simplified diagram illustrating a method of AnswerFast4 according to an embodiment of the present invention with media transmitted in AnswerFast4 frames.

After sending an AnswerFast4 Request and optionally detecting an AnswerFast4 Response, the terminal will begin a normal session using the agreed mobile level. Audio and video exchange will also start immediately if they have not been started during the AnswerFast4 Response stage if in use.

Utilizing embodiments of the present invention, audio and video exchange are enabled to continue seamlessly if they have been started during the AnswerFast4 Response stage whether used or not.

Note in the example embodiment shown in FIG. 7A the Answerer (Entity B) is the Decision maker which selects the preferred mode of operation from Preference Modes proposed by the Caller (Entity A) in its Request Message. The Caller Preference Modes in its Request Message could include one or more Preference Modes. The Answerer Request Message could be empty or could include dummy informational messages. The Caller Request Message could be empty or could include dummy informational messages. The Answerer Response Message carries the adopted Preference Mode (i.e. the Answerer decides which mode to proceed with).

Note the roles of the decision making can be reversed. That is, the Caller could make the decision of preference mode to be adopted from the Preferences transmitted by the Answerer in its Request Message.

Another way to select a Decision Maker is to have both terminals transmit a random number and have the terminal with highest (or lowest) number be the decision maker. In case of a tie, the scheme would assume the Caller (or Answerer) to be the Decision maker.

Many possible schemes for appointing a Decision Maker are possible. The important aspect is the "rule" for appointing a Decision maker has to be adopted and used by both Terminals. There is no real advantage in using one or the other. The one illustrated in the embodiment is the simplest. With reference to FIG. 6, the Caller AF4 Request message can be constructed according to the procedure below:

Type IV Requests and Responses Construction Procedure

Step A: Let S1=the Equipment Preferences message (explicit or coded such as an index in a table). The Equipment Preferences include information as described in the Type III technique. The message can be expressed as an encoded ASN.1 string or using another syntax.

Step B: Let S2=S1 encoded for error robustness. If no error coding is used then S2 is equal to S1.

Step C: Let S3=S2 framed with framing flag sequence for facilitating detection and synchronization. Note frame flag emulation in the S2 needs to be detected and protected. Protection can utilize a repetition mechanism. For example if the framing flag is <f1><f2>, and an <f1><f2> occurs in S2, then the <f1><f2> is replaced by <f1><f2><f1><f2> by the transmitted. The receiver will replace any received <f1><f2><f1><f2> by <f1><f2>. Note that if error encoding is used then this could be signaled by using a different set of framing flags in this procedure.

Step D: S4=S3 framed padded with framing flag sequence in order to extend the length of the string (number of octets) to a multiple of 160 octets. This optional step is practical for 3G-324M implementation as the transmission time slots typically correspond to 160 octets. If padding is not important then S4 is same as S3.

The caller and answerer terminals transmit their Request message constructed as described above one or more times (typically a minimum of 2) back to back (separated only by padding or synchronization and framing flags) in order to avoid cases where the first few octets of S4 could have been lost because of bearer setup timing.

After the caller terminal transmits its preferred modes it expects a response or a conventional H.324-like initial bearer transmission of this method of session speed-up is not supported. What the answerer first transmits on the bearer channel can be ignored by the caller and only used by the caller to notice that the called (answerer) terminal supports this method of session speed-up. The called terminal transmits its response which incorporates the accepted mode of operation as described in the Type III operation with the only difference being that the messages would be constructed according the construction procedure above with the message being the response message.

Once the caller terminal receives the response it can start transmitting its media. The called terminal will be in position to accept media when it has transmitted its response.

Note that the caller will be in a position to accept media according to its proposal when it transmits its request.

Note if the terminals do not recognize the messages or cannot detect them (e.g., because of corruption) then they can proceed according to Type II speed-up.

Although embodiments of the present invention have been described in the context of an AnswerFast Type IV implementation, it is understood that the methods and systems provided according to embodiments of the present invention are also applicable to AnswerFast Type II and Type III implementations. Additional discussion related to these alternative implementations is provided in U.S. patent application Ser. No. 10/732,917, filed on Dec. 9, 2003, and entitled "Methods and System for Fast Session Establishment Between Equipment Using H.324 and Related Telecommunications Protocols" and U.S. patent application Ser. No. 10/934,077, filed on Sep. 3, 2004, and entitled "Methods and System for Fast Session Establishment Between Equipment Using H.324 and Related Telecommunications Protocols," both of which are incorporated by reference herein in their entirety for all purposes.

ASN.1 Syntax for Fast Session Setup Procedure

Embodiments of the present invention provide the complete ASN.1 syntax script used for Fast Session Setup Procedure used in embodiments of the present invention.

Fast Session Setup ASN.1 Syntax

```
FASTSESSIONSETUP DEFINITIONS AUTOMATIC TAGS    ::=
BEGIN
IMPORTS
        NonStandardIdentifier,
        NonStandardParameter,
        MultiplexCapability,
        MultiplexEntrySend,
        OpenLogicalChannel
   FROM MULTIMEDIA-SYSTEM-CONTROL;
FastSessionSetupRequest  ::=    CHOICE
{
    nonStandard            NonStandardParameter,
    predefinedProfile      FastSessionSetupPredefinedRequest,
    explicitProfile        FastSessionSetupExplicitRequest,
    ...
}
FastSessionSetupResponse:: =    CHOICE
{
    nonStandard            NonStandardParameter,
    predefinedProfile      FastSessionSetupPredefinedResponse,
    explicitProfile        FastSessionSetupExplicitResponse,
    ...
}
FastSessionSetupPredefinedRequest    ::=  SEQUENCE
(
    version                INTEGER (1..7),
    h245version            INTEGER (1..31),
    vendorId               NonStandardIdentifier OPTIONAL,
    terminalType           INTEGER (0..255), -- For
    MasterSlaveDetermination
    initialMobileLevel     INTEGER (0..7), -- [4,7] are reserved
    h223Info               SEQUENCE
    {
        h223AnnexADoubleFlag      BOOLEAN,
        h223AnnexBOptionalHeader       BOOLEAN,
        multiplexProfile INTEGER       (0..65535) OPTIONAL,
```

-continued
```
      } OPTIONAL,
      capabilityProfile INTEGER (0..65535) OPTIONAL,
      audioProfiles SET SIZE (1..65535) OF INTEGER (0..65535)
OPTIONAL,
      videoProfiles SET SIZE (1..65535) OF INTEGER (0_.65535)
OPTIONAL,
      dataApplicationProfiles   SET SIZE (1..65535) OF INTEGER
      (0..65535)
OPTIONAL,
      encryptionProfiles        SET SIZE (1..65535) OF INTEGER
                                (0..65535)
OPTIONAL,
      additionalParameters    OCTET STRING OPTIONAL,
      mediaTunnel BOOLEAN,
      modeDetermination CHOICE
      {
           simultaneous     NULL,
           byCallee         NULL,
      }
FastSessionSetupPredefinedResponse    ::=   SEQUENCE
{
      version          INTEGER (1..7),
      h245version      INTEGER (1..31),
      vendorId         NonStandardIdentifier OPTIONAL,
      terminalType     INTEGER (0..255), -- For
MasterSlaveDetermination
      mobileLevel      INTEGER (0..7), -- [4,7] are reserved
      h223Info         SEQUENCE
      {
           h223AnnexADoubleFlag       BOOLEAN,
           h223AnnexBOptionalHeader       BOOLEAN,
           multiplexProfile            INTEGER (0..65535)
                                       OPTIONAL,
           ...
      } OPTIONAL,
      capabilityProfile       INTEGER (0..65535) OPTIONAL,
      audioProfiles           SET SIZE (1..65535) OF INTEGER
                              (0..65535)
OPTIONAL,
      videoProfiles      SET SIZE (1..65535) OF INTEGER (0..65535)
OPTIONAL,
      dataApplicationProfiles SET SIZE (1..65535) OF INTEGER
      (0..65535) OPTIONAL,
      encryptionProfiles      SET SIZE (1..65535) OF INTEGER
                              (0..65535)
OPTIONAL,
      additionalParameters    OCTET STRING OPTIONAL,
      ...
}
FastSessionSetupExplicitRequest       ::=   SEQUENCE
{
      version          INTEGER (1..7),
      h245version      INTEGER (1..31),
      vendorId         NonStandardIdentifier OPTIONAL,
      terminalType     INTEGER (0..255), -- For
MasterSlaveDetermination
      initialMobileLevel       INTEGER (0..7), -- [4,7] are reserved
      h223Info         SEQUENCE
      {
           h223AnnexADoubleFlag       BOOLEAN,
           h223AnnexBOptionalHeader       BOOLEAN,
           multiplexEntrySend          MultiplexEntrySend OPTIONAL,
           ...
      } OPTIONAL,
      multiplexCapability     MultiplexCapability OPTIONAL,
      openLogicalChannels     SET SIZE (1..65535) OF
                              OpenLogicalChannel
OPTIONAL,
      additionalParameters    OCTET STRING OPTIONAL,
      mediaTunnel BOOLEAN,
      modeDetermination CHOICE
      {
           simultaneous     NULL,
           byCallee         NULL,
      },
      ...
}
FastSessionSetupExplicitResponse      ::=   SEQUENCE
{
      version          INTEGER (1..7),
      h245version      INTEGER (1..31),
      vendorId         NonStandardIdentifier OPTIONAL,
      terminalType     INTEGER (0..255), -- For
MasterSlaveDetermination
      mobileLevel      INTEGER (0..7), -- [4,7] are reserved
      h223Info         SEQUENCE
      {
           h223AnnexADoubleFlag       BOOLEAN,
           h223AnnexBOptionalHeader       BOOLEAN,
           multiplexEntrySend          MultiplexEntrySend OPTIONAL,
      } OPTIONAL,
      multiplexCapability     MultiplexCapability OPTIONAL,
      openLogicalChannels     SET SIZE (1..65535) OF
                              OpenLogicalChannel
OPTIONAL,
      additionalParameters    OCTET STRING OPTIONAL,
      ...
}
END
```

Additionally, it is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of determining an H.223 operating multiplexer level for a session between a pair of H.324 terminals coupled to a telecommunications network, the method comprising:
    providing a first profile for an initial H.223 multiplexer level for the session, the first profile comprising a first integer for the H.223 multiplexer level, a first Boolean value for H.223 Annex A double flag mode, and a second Boolean value for H.223 Annex B optional header mode;
    transmitting the first profile from the first H.324 terminal to the second H.324 terminal through the telecommunications network;
    receiving a second profile for the initial H.223 multiplexer level for the session, the second profile comprising a second integer for the H.223 multiplexer level, a third Boolean value for H.223 Annex A double flag mode, and a fourth Boolean value for H.223 Annex B optional header mode;
    determining the H.223 operating multiplexer level, based, in part, on at least the first integer for the H.223 multiplexer level and the second integer for the H.223 multiplexer level; and
    transmitting information from the first H.324 terminal to the second H.324 terminal through the telecommunications network at the H.223 operating multiplexer level.

2. The method of claim 1 wherein the first profile is provided in a payload of a frame.

3. The method of claim 2 wherein the frame comprises the payload, a payload length field, a frame information field, and a CRC field.

4. The method of claim 3 wherein the frame information field comprises a three bit segment sequence number field and a last segment field.

5. The method of claim 4 further comprising:
    processing the frame by applying a flag emulation avoidance procedure to the frame; and
    transmitting the processed frame from the first H.324 terminal to the second H.324 terminal.

6. The method of claim 5 wherein the processed frame is transmitted between a first synchronization flag and a second synchronization flag.

7. The method of claim 1 wherein the information transmitted from first H.324 terminal to the second H.324 terminal comprises at least one of audio, video, or data.

8. A non-transitory computer-readable medium encoded with instructions for determining an H.223 operating multiplexer level for a session between a pair of H.324 terminals coupled to a telecommunications network, the computer-readable medium comprising:

one or more instructions for providing a first profile for an initial H.223 multiplexer level for the session, the first profile comprising a first integer for the H.223 multiplexer level, a first Boolean value for H.223 Annex A double flag mode, and a second Boolean value for H.223 Annex B optional header mode;

one or more instructions for transmitting the first profile from the first H.324 terminal to the second H.324 terminal through the telecommunications network;

one or more instructions for receiving a second profile for the initial H.223 multiplexer level for the session, the second profile comprising a second integer for the H.223 multiplexer level, a third Boolean value for H.223 Annex A double flag mode, and a fourth Boolean value for H.223 Annex B optional header mode;

one or more instructions for determining the H.223 operating multiplexer level, based, in part, on at least the first integer for the H.223 multiplexer level and the second integer for the H.223 multiplexer level; and one or more instructions for transmitting information from the first H.324 terminal to the second H.324 terminal through the telecommunications network at the H.223 operating multiplexer level.

9. The computer-readable medium of claim 8 wherein the first profile is provided in a payload of a frame.

10. The computer-readable medium of claim 9 wherein the frame comprises the payload, a payload length field, a frame information field, and a CRC field.

11. The computer-readable medium of claim 10 wherein the frame information field comprises a three bit segment sequence number field and a last segment field.

12. The computer-readable medium of claim 11 further comprising:

one or more instructions for processing the frame by applying a flag emulation avoidance procedure to the frame; and one or more instructions for transmitting the processed frame from the first H.324 terminal to the second H.324 terminal.

13. The computer-readable medium of claim 12 wherein the processed frame is transmitted between a first synchronization flag and a second synchronization flag.

14. The computer-readable medium of claim 8 wherein the information transmitted from first H.324 terminal to the second H.324 terminal comprises at least one of audio, video, or data.

* * * * *